(12) United States Patent
Nakhjiri

(10) Patent No.: US 8,285,990 B2
(45) Date of Patent: Oct. 9, 2012

(54) METHOD AND SYSTEM FOR AUTHENTICATION CONFIRMATION USING EXTENSIBLE AUTHENTICATION PROTOCOL

(75) Inventor: Madjid F. Nakhjiri, San Diego, CA (US)

(73) Assignee: Future Wei Technologies, Inc., Plano, TX (US)

( * ) Notice: Subject to any disclaimer, the term of this patent is extended or adjusted under 35 U.S.C. 154(b) by 822 days.

(21) Appl. No.: 12/113,099

(22) Filed: Apr. 30, 2008

(65) Prior Publication Data
US 2009/0031138 A1 Jan. 29, 2009

Related U.S. Application Data

(60) Provisional application No. 60/917,875, filed on May 14, 2007.

(51) Int. Cl.
*H04L 29/06* (2006.01)
(52) U.S. Cl. ........ 713/168; 713/150; 713/151; 713/170; 726/3; 726/14; 380/247; 380/270; 380/272
(58) Field of Classification Search ............... 713/156, 713/168, 170, 185; 726/27; 380/247, 279
See application file for complete search history.

(56) References Cited

U.S. PATENT DOCUMENTS

| | | | |
|---|---|---|---|
| 6,879,690 B2* | 4/2005 | Faccin et al. | 380/247 |
| 7,069,433 B1 | 6/2006 | Henry et al. | |
| 7,171,555 B1* | 1/2007 | Salowey et al. | 713/156 |
| 7,181,196 B2* | 2/2007 | Patel | 455/411 |
| 7,210,163 B2 | 4/2007 | Stoll | |
| 7,210,167 B2 | 4/2007 | Brezak et al. | |
| 2002/0174335 A1 | 11/2002 | Zhang et al. | |
| 2003/0046541 A1 | 3/2003 | Gerdes et al. | |
| 2003/0110375 A1 | 6/2003 | Colvin | |
| 2004/0088544 A1 | 5/2004 | Tariq et al. | |
| 2004/0250119 A1 | 12/2004 | Shelest et al. | |
| 2005/0177733 A1* | 8/2005 | Stadelmann et al. | 713/185 |

(Continued)

FOREIGN PATENT DOCUMENTS

CN 1329418 A 1/2002

(Continued)

OTHER PUBLICATIONS

Dukes, Configuration Payload Internet Draft <draft-dukes-ikev2-config-payload-00.txt> dated Dec. 2002, retrieved from http://tools.ietf.org/id/draft-dukes-ikev2-config-payload-00.txt on Feb. 7, 2011.*

(Continued)

*Primary Examiner* — Oscar Louie
*Assistant Examiner* — Gary Lavelle
(74) *Attorney, Agent, or Firm* — Slater & Matsil, L.L.P.

(57) ABSTRACT

A method for secure and reliable authentication in a communication system. In an embodiment, the authentication method includes performing authentication of a user utilizing Extensible Authentication Protocol (EAP), and transmitting a result indication message to the user. The result indication message can include additional information for security and reliability. The method also includes receiving an acknowledgement message from the user. The acknowledgement message is sent by the user for confirming the reception of the result indication. In an embodiment, the method also includes retransmitting the result indication message if the acknowledgement message is not received within a predetermined time. The additional information for security and reliability can include Message Authentication Code (MAC) and time interval information. The additional information for security and reliability can also include a security/reliability flag.

30 Claims, 4 Drawing Sheets

U.S. PATENT DOCUMENTS

| | | | |
|---|---|---|---|
| 2006/0185013 A1 | 8/2006 | Oyama et al. | |
| 2006/0236116 A1 | 10/2006 | Patel | |
| 2007/0209064 A1 | 9/2007 | Qin et al. | |
| 2007/0214498 A1 | 9/2007 | Pindra et al. | |
| 2007/0220598 A1 | 9/2007 | Salowey et al. | |
| 2007/0297611 A1 | 12/2007 | Yun et al. | |
| 2008/0060065 A1 | 3/2008 | Wynn et al. | |
| 2008/0065883 A1* | 3/2008 | Zeng et al. | 713/168 |
| 2008/0127317 A1 | 5/2008 | Nakhjiri | |
| 2008/0141031 A1* | 6/2008 | Oba et al. | 713/170 |
| 2008/0175393 A1* | 7/2008 | Oba et al. | 380/279 |
| 2008/0178274 A1 | 7/2008 | Nakhjiri et al. | |

FOREIGN PATENT DOCUMENTS

| | | | |
|---|---|---|---|
| CN | 1486029 A | | 3/2004 |
| CN | 1564626 A | | 1/2005 |
| CN | 1674491 A | | 9/2005 |
| CN | 1831836 A | | 9/2006 |
| CN | 1836419 A | | 9/2006 |
| EP | 1 278 330 A1 | | 1/2003 |
| EP | 1 657 943 A1 | | 5/2006 |
| KR | 20050050794 A | | 6/2005 |
| WO | WO 01/72009 A2 | | 9/2001 |
| WO | WO 2004/112348 A1 | | 12/2004 |
| WO | WO 2004/112349 A1 | | 12/2004 |
| WO | WO 2005/004433 | * | 1/2005 |
| WO | WO 2005/109751 A1 | | 11/2005 |
| WO | WO 2006/022469 | * | 3/2006 |
| WO | WO 2006/022469 A1 | | 3/2006 |
| WO | WO 2006022469 A1 | | 3/2006 |
| WO | WO 2006/107713 A1 | | 10/2006 |
| WO | WO 2006/118342 A1 | | 11/2006 |

OTHER PUBLICATIONS

Vollbrecht, RFC4137—State Machines for Extensible Authentication Protocol, Aug. 2005, retrieved from http://www.faqs.org/rfcs/rfc4137.html on Feb. 17, 2011.*

Clancy, Handover Key Management and Re-Authentication Problem Statement draft-clancy-hocky-reauth-ps-00, retrieved from http://tools.ietf.org/html/draft-ietf-hokey-reauth-ps-00 retreived on Feb. 17, 2011.*

Aboba, RFC3748 Extensible Communication Protocol (EAP), Jun. 2004, retrieved from http://www.ietf.org/rfc/rfc3748.txt on Feb. 17, 2011.*

Kafle, Extended Corespondent Registration Scheme for Reducing Handover Delay in Mobile IPv6, May 12, 2006, retreived from http://ieeexplore.ieee.org/stamp/stamp.jsp?tp=&arnumber=1630646 on Feb. 16, 2011.*

Narayanan, EAP Extensions for Efficient Re-Authentication, draft-vidya-eap-er-02, Jan. 19, 2007, retreived from http://tools.ietf.org/html/draft-vidya-eap-er-02 on Feb. 2, 2011.*

Cheikhrouhou, Security architecture in a multi-hop mesh network, Jun. 2006, retrieved from http://www-lor.int-evry.fr/~maknavic/articles/mlaurent-sar06.pdf on Feb. 2, 2011.*

Dondeti, EAP Efficient Re-Authentication, Mar. 2007, retrieved from http://www.ietf.org/proceedings/68/slides/hokey-2.pdf on Feb. 16, 2011.*

Carter, PPP EAP ISAKMP Authentication Protocol, Nov. 19, 1997, retreived from http://tools.ietf.org/html/draft-ietf-pppext-eapisakmp-00 on Feb. 15, 2011.*

Narayanan, V., et al., "EAP Extensions for EAP Re-authentication Protocol (ERP)," RFC 5296, Network Working Group, Aug. 2008, 44 pages.

Aboba, B., et al., "Extensible Authentication Protocol (EAP) Key Management Framework," Internet-Draft, EAP Working Group, Feb. 7, 2007, 68 pages.

Kaufman, C., "Internet Key Exchange (IKEv2) Protocol," RFC 4306, Network Working Group, Dec. 2005, 98 pages.

Salowey, J., et al., "Specification for the Derivation of Usage Specific Root Keys (USRK) from an Extended Master Session Key (EMSK)," Internet-Draft, Network Working Group, Jan. 11, 2007, 16 pages.

PCT International Search Report and Written Opinion, Aug. 28, 2008, pp. 1-10, PCT/CN2008/070952.

Harkins et al., "Problem Statement and Requirements on a 3-Party Key Distribution Protocol for Handover Keying", Network Working Group, Mar. 4, 2007, 17 pages.

Kohl et al., "The Evolution of the Kerberos Authentication Service", EurOpen Confence in Tromso, Norway, Spring 1991, Published in IEEE Computer Society Press; 15 pages.

Nakhjiri et al., "A Network Service Identifier for Separation of Mobile IPv6 Service Authorization from Mobile Node Authentication", Network Working Group, Jan. 18, 2007, 19 pages.

Nakhjiri, "Keying and Signaling for Wireless Access and Handover using EAP (EAP-HR)", Network Working Group, Apr. 5, 2007, 23 pages.

Neuman et al., "Kerberos: An Authentication Service for Computer Networks", http://gost.isi.edu/publications/kerberos-neuman-tso.html, IEEE Communications Magazine, vol. 32, No. 9, Sep. 1994m 10 pages.

Written Opinion of the International Searching Authority, International Application No. PCT/CN2007/070570, Applicant: Huawei Technologies Co., Ltd., Dated: Dec. 6, 2007, 4 pages.

Chinese Office Action, Chinese Application No. 200780042379.0, Applicant: Huawei Technologies Co., Ltd., Dated: Apr. 23, 2010, 10 pages.

Aboba, B. et al., "The Network Access Identifier," RFC 4282, The Internet Society, 15 pages, Dec. 2005.

Arkko, J. et al., "Extensible Authentication Protocol Method for 3rd Generation Authentication and Key Agreement (EAP-AKA)," RFC 4187, The Internet Society, 74 pages, Jan. 2006.

Giaretta, G., et al., "Mobile IPv6 Bootstrapping in Split Scenario," The IETF Trust, 29 pages, Jul. 22, 2007.

Kim, et al., "Improving Cross-domain Authentication over Wireless Local Area Networks", 2005, IEEE, pp. 1-12.

Lee, et al., "The Design of Dynamic Authorization Model for User centric service in Mobile Environment," Feb. 20-22, 2006, IEEE, pp. 2124-2127.

Zuleger, H., "Mobile Internet Protocol MIPv6; A brief introduction," Holger.Zuleger@hznet.de, Dec. 13, 2005, 15 pages.

Kivistö, M., et al., "802.16e—Mobile WiMAX,"IEEE, 28 pages, May 2005.

Sithirasenan, E., et al., "IEEE 802.11i WLAN Security Porotocol—A Software Engineer's Model," IEEE, 2005, 12 pages.

Eronen, P., et al., "Diameter Extensible Authentication Protocol (EAP) Application," Network Working Group, Standards Track, RFC 4072, Aug. 2005, 33 pages.

* cited by examiner

METHOD AND SYSTEM FOR AUTHENTICATION CONFIRMATION USING EXTENSIBLE AUTHENTICATION PROTOCOL

CROSS-REFERENCES TO RELATED APPLICATIONS

This application claims the priority benefit of U.S. Provisional Application No. 60/917,875, filed May 14, 2007, commonly assigned and incorporated by reference herein for all purposes.

This application is also related to co-pending U.S. patent application Ser. No. 11/938,048, filed Nov. 9, 2007, which is commonly assigned and incorporated by reference herein for all purposes.

BACKGROUND OF THE INVENTION

The present invention relates generally to telecommunication. More particularly, the invention provides a method and system for enhancing reliability and security protection in telecommunication access control. Merely by way of example, the invention has been applied to an authentication process utilizing Extensible Authentication Protocol (EAP) for improved reliability and security. But it would be recognized that the invention has a much broader range of applicability. For example, the invention can be applied to other telecommunication protocols.

Extensible Authentication Protocol (EAP) is gaining more and more popularity as both authentication and key management framework. Different authentication methods (called EAP methods) can be used between an end client (EAP peer) and a server (EAP server), by embedding method-specific exchanges within generic EAP request and response messages. This allows for intermediaries, such as network edge devices (pass-through authenticators, base stations) and proxies to simply partake in forwarding the authentication signaling through the network without understanding the semantics of the authentication mechanism. The functionalities, expected from the intermediaries include the following:
1. The EAP pass-through authenticator is the point, where EAP encapsulation inside access network link (wireless link or wired) layer protocol is converted into EAP encapsulation in an Authentication Authorization Accounting (AAA) protocol.
2. The EAP pass-through authenticator is expected to understand two final EAP messages (on their way to the EAP peer): EAP Success and EAP Failure, arriving from the EAP server, indicating the result of the authentication process, The pass-through authenticator following reception of an EAP-Success, allows the creation of a network attachment between the peer and the network point of attachment (edge device: base station, access point, etc).

While the above functionality can be seen as sufficiently secure and reliable for an authentication framework, it is not from the network control and security key distribution point of view, as discussed in more detail below.

Therefore, methods and systems that provide enhanced security and reliability in an authentication process are desirable.

BRIEF SUMMARY OF THE INVENTION

The present invention relates generally to telecommunication. More particularly, the invention provides a method and system for enhancing reliability and security protection in telecommunication access control. Merely by way of example, the invention has been applied to an authentication process utilizing Extensible Authentication Protocol (EAP) for improved reliability and security. But it would be recognized that the invention has a much broader range of applicability. For example, the invention can be applied to other telecommunication protocols.

According to a specific embodiment, the invention provides a method of authentication in a communications system. The method improves reliability by building a reliability mechanism including acknowledgement and retransmission for result indication for authentication, re-authentication, and access control mechanisms. The method is illustrated using application examples for EAP authentication, HOKEY re-authentication, and key management. The method is performed without being authentication method dependent. The method improves security by building a security mechanism for the process at the same time. The method also provides ability for intermediaries to perform the required exchanges, and avoid lengthy and expensive exchanges with the backend servers. Such intermediaries include authenticators and base stations, etc. At the same the method adds novel features to link layers. In some embodiments, the method also builds the interoperability between newer and legacy methodology, such as EAP versus HOKEY procedures.

In an embodiment, the authentication method includes the following processes:
1. performing authentication of a user utilizing Extensible Authentication Protocol (EAP);
2. transmitting a result indication message to the user, the result indication message including additional information for security and reliability; and
3. receiving an acknowledgement message from the user, the acknowledgement message confirming the reception of the result indication.

In an embodiment, the method also includes retransmitting the result indication message if the acknowledgement message is not received within a predetermined time. The additional information for security and reliability can include Message Authentication Code (MAC) and time interval information. Depending on the embodiment, the additional information for security and reliability can include a security/reliability flag and a message authentication code (MAC).

Depending on the embodiment, the method can be performed by different servers. In an example, the method is performed by an Extensible Authentication Protocol (EAP) server. In another example, the method is performed by an authentication, authorization, and accounting (AAA) server. Alternatively, the method can be performed by a network intermediary, such as a base station, an access point, a gateway, or an EAP authenticator.

In a specific embodiment, the success message is adapted for further including a preference message for an EAP Extension protocol. The success message can also be adapted for further including additional payload, the additional payload including service material or keys for a third party.

In an alternative embodiment, the success message may be sent to an authenticator, and the success message includes a preference message for an EAP Extension protocol. An example of the EAP Extension protocol is Hokey. When an authenticator is utilized, the authenticator, after receiving the preference message, sends a TLV to the user indicating availability of HOKEY service. Subsequently, the user sends a message indicating its preference for EAP or HOKEY.

In alternative embodiments, the present invention also provides a communication system and associated network devices for providing security and reliability to an authentication process.

Many benefits are achieved by way of the present invention over conventional techniques. For example, the present technique provides an easy to use process that can be easily incorporated into conventional technology. In some embodiments, the invention provides a method for enhancing the security and reliability of the authentication process. In other embodiments, the invention provides a method for backward compatibility between a new protocol and a legacy protocol. Depending upon the embodiment, one or more of these benefits may be achieved. These and other benefits will be described in more detail throughout the present specification and more particularly below.

Various additional objects, features, and advantages of the present invention can be more fully appreciated with reference to the detailed description and accompanying drawings that follow.

DETAILED DESCRIPTION OF THE INVENTION

Figure 1:
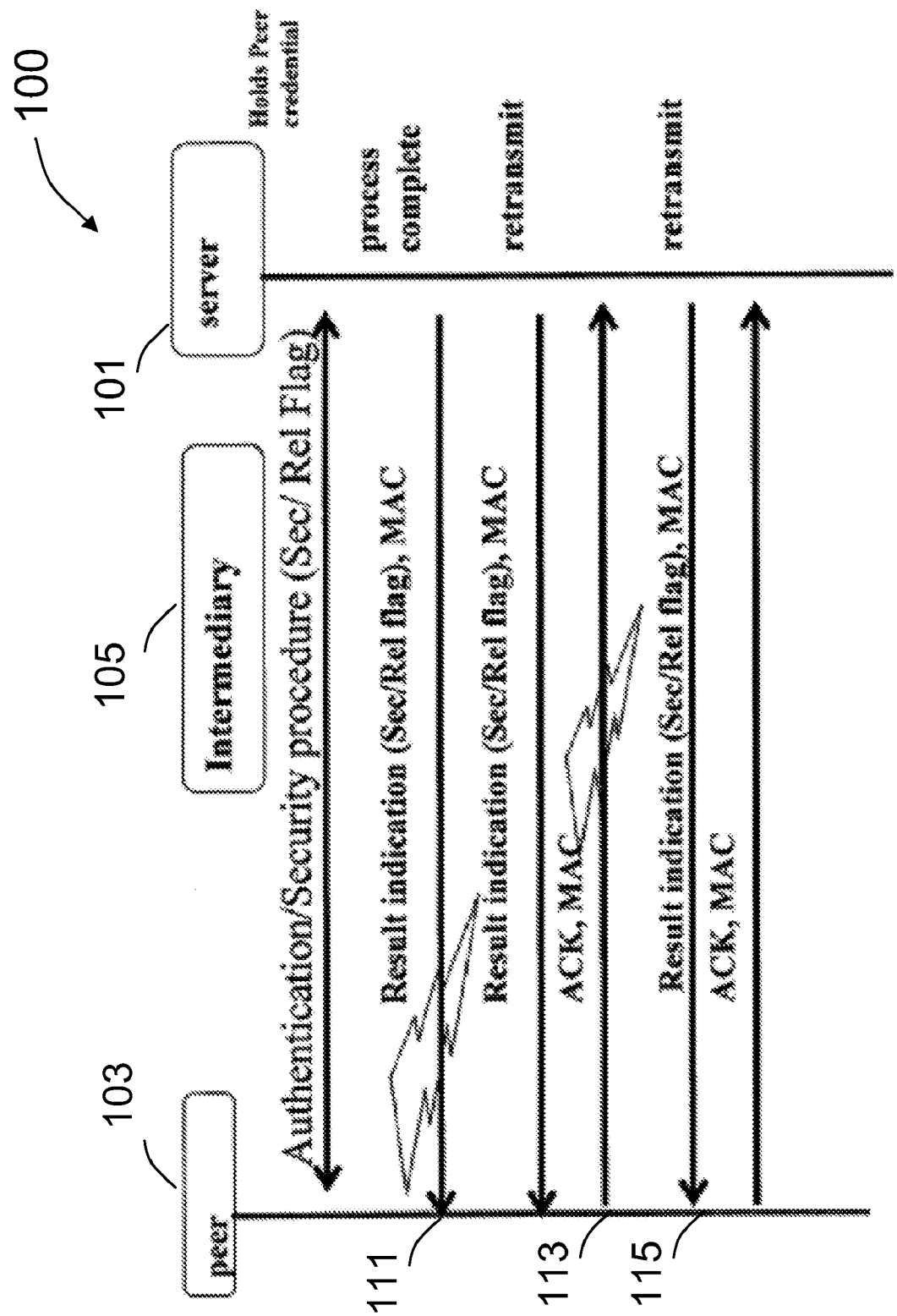
FIG. 1 is a simplified view diagram illustrating a communications system according to an embodiment of the present invention.

The present invention relates generally to telecommunication. More particularly, the invention provides a method and system for enhancing reliability and security protection in telecommunication access control. Merely by way of example, the invention has been applied to an authentication process utilizing Extensible Authentication Protocol (EAP) for improved reliability and security. But it would be recognized that the invention has a much broader range of applicability. For example, the invention can be applied to other telecommunication protocols.

As discussed above, conventional authentication methods suffer from many limitations. Currently, the conventional EAP signaling framework does not provide security protection for the EAP Success indication. Neither does the framework provide a reliability protection for the EAP Success losses. Method-specific procedures for providing reliability for EAP Success are not provided, and method-independent procedures have not been presented either.

Conventional methods lack protection for result indication. The authenticator acts as a gate controller for network attachment; upon reception of an EAP Failure, the authenticator can simply deny access to the client. Since neither EAP Success nor EAP Failure messages arrive from the server without security protection, a rouge authenticator may simply change the result from Success to Failure before forwarding the message to the peer and thus cause a denial of service attack. Also loss of EAP Success either in the network side or over the wireless link due to lack of reliability can halt the network connection process. Providing security protection for the EAP Success message and a method to provide a confirmation to the server about reception of the EAP Success by the peer will alleviate this problem.

Conventional methods also lack protection for key distribution data. EAP is now being extended to provide key distribution mechanisms for a variety of wireless and mobile applications. As part of this process, keys, tokens, and other material are distributed to both the peer and the pass-through authenticator. This may require piggybacking of such material to the EAP Success or newer variations of EAP Success messages. Loss of the EAP Success message due to unintentional channel perturbations, network congestion or due to intentional and malicious attacks can disrupt the provisioning of the peer network attachment.

Therefore, methods and systems that provide enhanced security and reliability in an authentication process are highly desirable.

According to embodiments of the present invention, methods are provided for security protection for the EAP Success. In some embodiments, the invention provides methods for reliability protection for the EAP Success losses. In a specific embodiment, method-specific procedures are provided for the reliability for EAP Success. In other embodiments, method-independent procedures are also provided.

In an alternative embodiment, a method is provided for discovery/negotiation between legacy and newer authentication, access control and key management services. For instance, when the legacy framework for authentication and key management is EAP, the entities involved, including but not limited to EAP server, service agent (authenticator) and end client/supplicant/EAP peer are using EAP key management functions and EAP master session key (MSK) for establishing secure links between the supplicant and the network. On the other hand when the involved entities use Handover Keying (HOKEY) framework, the management functions use newer key hierarchies and EAP extended master session key (EMSK). Reliable and secure result indication allows these entities to interact in a robust manner. Without proper interoperability mechanism, the link establishment mechanisms will fail without appropriate failover mechanisms.

Embodiments of the present invention add reliability and security protection to indication of the result of authentication, and access control procedures, such as re-authentication, key management, handover key management, and related authorization procedures.

In an embodiment, the reliability is achieved through adding an acknowledgement procedure to the result indication. Support for reliability can be communicated before hand or when acknowledgements are required.

In another embodiment, the security is achieved by adding integrity protection to the result indication and the acknowledgement procedures.

The reliability and security mechanisms provided can be on end-to-end or hop by hop basis, especially when parts of end to end link (such as the wireless parts) are considered more prune to intentional or unintentional perturbations. The added features can also serve as a way to improve backward compatibility in case the initial procedures for which the result is being indicated is to be followed by some more advanced follow up mechanisms.

FIG. 1 is a simplified view diagram illustrating a communications system according to an embodiment of the present invention. This diagram is merely an example, which should not unduly limit the scope of the claims herein. One of ordinary skill in the art would recognize other variations, modifications, and alternatives. As shown, communication system 100 includes a network server device 101 and a network peer device 103. The network server device 101 is adapted to perform authentication of the network peer device utilizing Extensible Authentication Protocol (EAP). The network server device 101 is also adapted to transmit a result indication message to the network peer device 103. In an embodiment, the result indication message including additional information for security and reliability. Additionally, the network sever device 101 is also configured to receive an acknowledgement message (ACK) from the network peer device. The acknowledgement message is configured to include additional information for security, such as a Message Authentication Code (MAC). The network sever device 101 then confirms that the peer device 103 has received the result indication message. The network device can proceed with authentication of the network peer device 103.

As shown in FIG. 1, the network server device 101 is also adapted for retransmitting the result indication if the acknowledgement message is not received. In FIG. 1, the first result indication is shown (111) as not reaching the peer device 103. In this case, the server resends the result indication. Similarly, the first ACK message is shown (113) as not reaching the server 101. In an embodiment, when an ACK is not received within a predetermined time, the server resends the result indication (115), as shown in FIG. 1.

Figure 2:
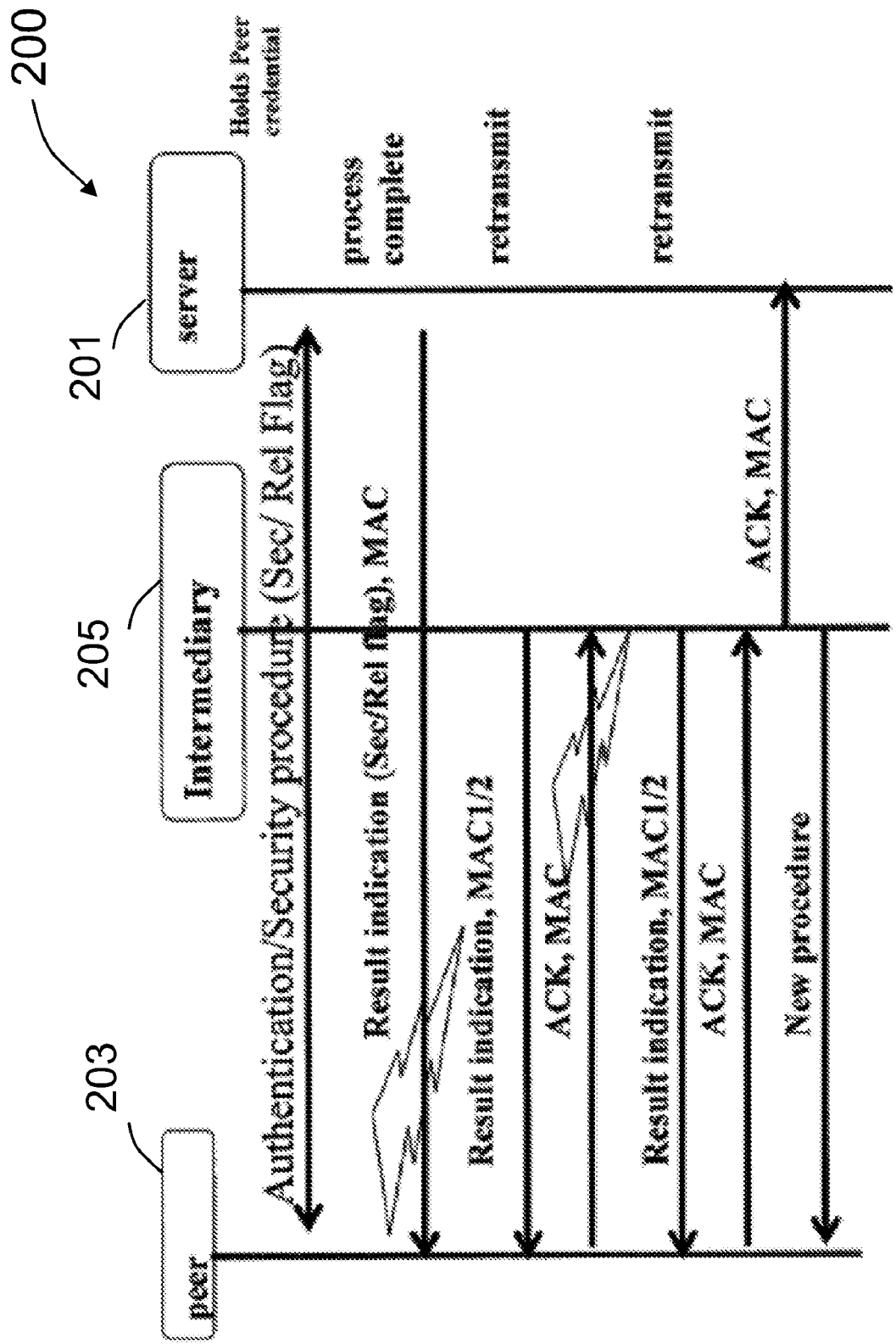
FIG. 2 is a simplified view diagram illustrating a communications system according to another embodiment of the present invention.

FIG. 2 is a simplified view diagram illustrating a communications system according to an alternative embodiment of the present invention. This diagram is merely an example, which should not unduly limit the scope of the claims herein. One of ordinary skill in the art would recognize other variations, modifications, and alternatives. As shown, communication system 200 includes server device 201 and peer device 203, similar to communication system 100 of FIG. 1. Additionally, communication system 200 has an additional intermediary authenticator device 205. As shown, authenticator device 205 is adapted to transmit a result indication message to the network peer device 203. In an embodiment, the result indication message includes a success message that is capable of including additional information for security and reliability. The authenticator device 205 also receives an acknowledgement message (ACK) from the network peer device 203. The acknowledgement message is configured to include additional information for security, such as a Message Authentication Code (MAC). The authenticator device 205 then transmits the acknowledge message to the server device 201.

Figure 3:
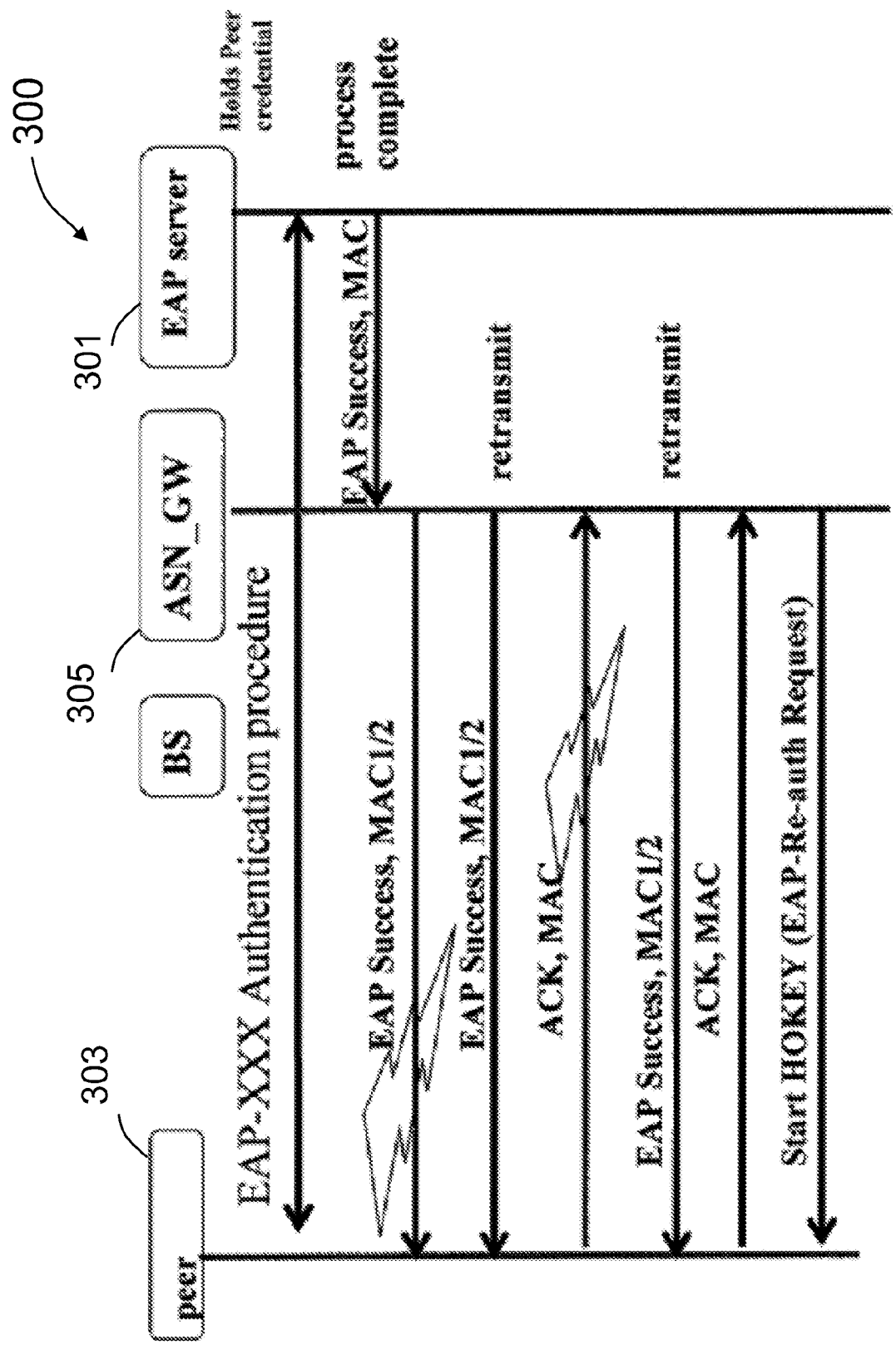
FIG. 3 is a simplified view diagram illustrating a communications system including WiMax intermediary support according to a specific embodiment of the present invention.

FIG. 3 is a simplified view diagram illustrating a communications system including WiMax intermediary support according to a specific embodiment of the present invention. This diagram is merely an example, which should not unduly limit the scope of the claims herein. One of ordinary skill in the art would recognize other variations, modifications, and alternatives. As shown, communication system 300 includes an EAP server 301, a peer device 303, and an intermediary device 305, such as an ASN gateway (ASN_GW) or a base station (BS). More details of the devices and their functions are provided below.

Figure 4:
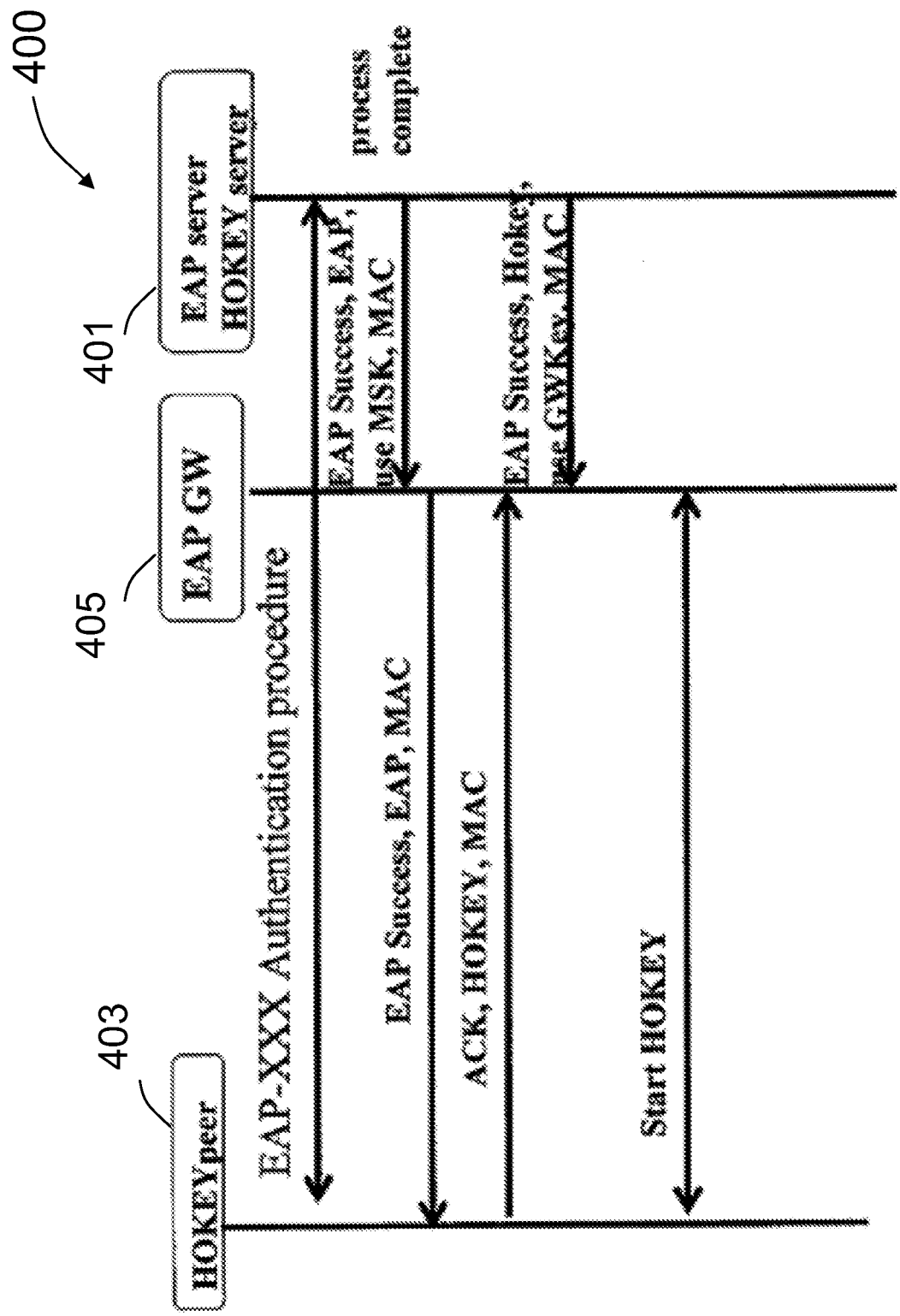
FIG. 4 is a simplified view diagram illustrating a communications system including backward compatibility support according to an alternative embodiment of the present invention.

FIG. 4 is a simplified view diagram illustrating a communications system including backward compatibility support according to an alternative embodiment of the present invention. As shown, communication system 400 includes a server 401 that has capability as an EAP server or a HOKEY server, a peer device 403, and an intermediary device 405 which can be an EAP gateway (EAP_GW). In an embodiment, the success indication message is capable of further including a preference message for a protocol other than EAP, for example Handover Keying (HOKEY). In the specific embodiment of FIG. 4, the network server device 401 is further adapted to send the success message to an authenticator, such as EAP_GW 405. The success message can include a preference message for a protocol other than EAP, such as Handover Keying (HOKEY). As shown, the authenticator device 405, after receiving the preference message, sends a TLV to the peer device 403 indicating availability of HOKEY service. The peer device can then send a message indicating its preference for EAP or HOKEY. In FIG. 4, the HOKEY peer device 403 sends a message indicating its preference HOKEY. Subsequently, network service is established using the HOKEY protocol.

According to an embodiment, the present invention provides a network device for use in a communications system. The network device can be a server device, such as 101, 201, 301, or 401 in FIGS. 1-4. The network device includes several components:

1. a first component adapted to perform authentication of a user utilizing Extensible Authentication Protocol (EAP);
2. a second component adapted to transmit a result indication message to the user or an authenticator;
3. a third component adapted to receive an acknowledgement message from the user, the acknowledgement message is configured to include a Message Authentication Code, and
4. a fourth component adapted to confirm authentication of the user.

Merely as an example, the network device may be an EAP server or an AAA server. The network device can also be a network intermediary. Examples of the network intermediary include an EAP authenticator such as a base station, an access point, or a gateway.

In a specific embodiment, the second component is adapted to retransmit the result indication if the acknowledgement message is not received. In some embodiments, the additional information for security and reliability includes a first Message Authentication Code and time interval information. For example, the additional information for security and reliability includes a security/reliability flag and a message authentication code (MAC). the success message is adapted for further including additional payload, including service material or keys for a third party.

In another specific embodiment, the second component is adapted for sending the success message to an authenticator. The success message is capable of further including a preference message for an EAP Extension protocol, such as Hokey. In another embodiment, the network device communicates with the user through an authenticator. The authenticator, after receiving the preference message, sends a TLV to the user indicating availability of HOKEY service. Subsequently, the user sends a message indicating its preference for EAP or HOKEY.

Although the above has been shown using a selected group of components for the system and network device for secure and reliable authentication, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

According to another embodiment of the present invention, a method of authentication in a communications system includes the following processes.

1. performing authentication of a user utilizing Extensible Authentication Protocol (EAP);
2. transmitting a result indication message to the user, the result indication message including additional information for security and reliability;
3. receiving an acknowledgement message from the user, the acknowledgement message confirming the reception of the result indication.

In an embodiment, the method also includes retransmitting the result indication message if the acknowledgement message is not received within a predetermined time. The additional information for security and reliability can include Message Authentication Code (MAC) and time interval information. Depending on the embodiment, the additional information for security and reliability can include a security/reliability flag and a message authentication code (MAC).

Depending on the embodiment, the method can be performed by different servers. In an example, the method is performed by an Extensible Authentication Protocol (EAP) server. In another example, the method is performed by an authentication, authorization, and accounting (AAA) server. Alternatively, the method can be performed by a network intermediary, such as a base station, an access point, a gateway, or an EAP authenticator.

In a specific embodiment, the success message is adapted for further including a preference message for an EAP Extension protocol. The success message can also be adapted for further including additional payload, the additional payload including service material or keys for a third party.

In an alternative embodiment, the success message may be sent to an authenticator, and the success message includes a preference message for an EAP Extension protocol. An example of the EAP Extension protocol is Hokey. When an authenticator is utilized, the authenticator, after receiving the preference message, sends a TLV to the user indicating availability of HOKEY service. Subsequently, the user sends a message indicating its preference for EAP or HOKEY.

The above sequence of processes provides a method for secure and reliable authentication according to an embodiment of the present invention. As shown, the method uses a combination of steps including a way of providing acknowledgement and message code. Other alternatives can also be provided where steps are added, one or more steps are removed, or one or more steps are provided in a different sequence without departing from the scope of the claims herein. Further details of the present invention can be found throughout the present specification and more particularly below A specific case is use of EAP for authentication and key management services, such as re-authentication or handover key management. Initial EAP authentication, EAP re-authentication, or key management today ends with an EAP success message transmitted by an EAP server to the client (EAP peer) through an EAP authenticator. The disclosure provides a way to confirm that EAP peer (and potentially also authenticator) has received the EAP Success in entirety without the packet being lost or tampered with (EAP Success has an identifier value, but the RFC does not describe how it can be used, it simply says it is there to match request and response, but there is no request or response for success.

To do that the client (or the authenticator or the base station) can send an Acknowledgement indicating that reception of EAP success. The acknowledgement can be sent to network intermediaries such as base station or access point (layer 2 point of attachment) authenticator (AAA client, EAP entity, WiMAX ASN-GW, 3G PDSN, etc), or to the EAP server or AAA server itself.

Based on lack of receipt of the acknowledgement (knowledge of the expiry of a timer), the intended recipient of the acknowledgement, can deduce that the entity that was to acknowledge reception of the EAP success has not received the EAP Success and thus a new EAP Success needs to be sent.

The second EAP success can be an exact replica of the initial one or different (i.e. a different code, etc). Alternatively, instead of sending a second EAP success, the network may decide to send the related information using other protocols than EAP, such as a link layer mechanism, such as a wireless link protocol (example an 802.16 PKMv2 message including the related TLVs). In such cases the entity in charge of link layer attachment (edge device, e.g. base station, access point) for the client simply proxies the EAP success and its information and makes sure the client will receive it eventually. The philosophy behind this is that most of signal perturbations occur at the last hop wireless link rather than within the network.

To avoid the vulnerability against compromised edge device, the client may ultimately transmit a protected (signed or encrypted) acknowledgement to the EAP/AAA server that issued in the initial EAP success.

Result indication includes indication for both success and failure. Thus, any of the mechanisms described for Success indications can also be implemented for Failure indications. However, since success indication is followed by service authorization, meaning that protecting Success indication has much greater benefit/cost impact, we focus most of the text on Success indications.

Success indication can be any of the following:
1. EAP success at the end of an EAP authentication method.
2. EAP success at the end of a re-authentication or handover keying signaling followed a previous EAP authentication process.
3. Any alternative message (such as a new EAP message with an EAP code different from EAP success, such as an EAP finish, or a new modified EAP success) at the end of a re-authentication or handover keying signaling (either from the peer or from the server).
4. A generic message (not just EAP) carrying assurance on a successful completion of an authentication, a re-authentication, a session extension, or key management process (e.g. a token carrying assurance that a key was delivered to a $3^{rd}$ party or a re-authentication process was complete). The message can be either from a client or a network component/server. The network component may include a gateway (such as a WiMAX ASN-GW) acting as a local key distribution or authentication center dealing with local mobility and security services.

Protection provided to the Success indication can be any of the following:
1. Security Protection: Adding a signature to Success indication (e.g. EAP Success) to prevent from modification of Success indication to failure. It is also preferred to add a freshness value to the Success message to prevent the replay of old Success messages by rouge parties.
2. Reliability Protection: Adding a reliability mechanism to Success indication. The receiver of the Success indication will provide an acknowledgement to the sender to ensure that the Success is not lost. It is preferred that the freshness value or a derivative thereof is included in the ACK message to allow the receiver of the ACK (sender of success) to match the success with its acknowledgement and prevent replay of previous Acknowledgements, or prevent man in the middle attacks where a rouge third party fakes a Success and ACK to both ends. It is also preferred that the ACK is signed by the sender.

Security protection can be done in any of the following ways:

1. Success indication to be signed by the server for the peer, i.e. in a way that only peers can verify the signature. This means a signature key, that only the end client and the server share, is used.
2. Success indication to be signed by the server by the server with signature that can be verified by an intermediary (such as an enforcement point at the edge of the network, e.g. an authenticator, a gateway or a base station). In this case, the intermediary will then need to provide integrity protection to the peer, i.e. a new signature must be added to the Success indication by the intermediary. This signature can be based on a key that the intermediary shares with the peer or a key that the intermediary shares with the next hop. All these alternatives are less preferred, since they are based on transitive trust relationships and introduce a vulnerability to compromised intermediaries between the server and the peer. However, in some networks, such as a WiMAX network where intermediaries such as ASN-GW are common, and delay performance is crucial, it is possible that the latency optimization is more important than perfect security properties. In such cases, requiring direct peer-server interactions to ensure security and reliability may be relaxed to allow the intermediary to act in a more independent manner and avoid referrals to far away and busy central servers.
3. Success indication to include a time interval over which the Success state is valid, following which the either the Success state is extended (by sending another success indication to the other side) or the Success state simply converts to failure state, rendering parts or all the progress, for which success was indicated, invalid.

In either case, Success Indication protection is done through use of a Message authentication Code (MAC) created by a keyed hash function, where the key is called Success_integrity_key (S_IK). For the two alternatives above, the S_IK can be generated differently depending on the entities sharing the key. It should be noted that the second alternative above would require more than one S_IK.

Also the capability of providing security protection for Success indication can be negotiated or broadcast in advance (through use of flags or in prior signaling, such as in EAP Identity signaling or EAP re-authentication signaling). Alternatively, the inclusion of security protection can be indicated in the success message itself through use of flags.

Reliability Protection to the Success Indication can be provided through one or a combination of the following:

1. The receiver of the Success message (e.g. peer receiving a message from the server) acknowledges receipt of the Success indication message with an Acknowledgement message (ACK). It is preferred that the ACK message is also signed with a keyed hash function and the MAC signature is added to the ACK. The key used is called Success_ACK_Integrity_Key (SA_IK).
2. The sender of the Success Indication stores a state on the time at which the Success message was sent and retransmits the Success message based on expiry of a preset timer. It is preferred that the retransmission is done following a random back-off period in relationship to the timer (after expiry or near the end, or others), so that in cases of a recovery following a massive network failures, no storms of Success retransmissions are created, that themselves could lead to network congestion and thus failure of delivery of the retransmitted Success messages. It is also preferred that the number of retransmissions is limited (or negotiated) and the intervals between retransmissions (timers) are preset or negotiated. Alternatively, an indication (e.g. a number) showing how many times a message has been or being retransmitted, can be adding to the message.
3. The sender of the Success indication includes an indication (e.g. a flag) for the receiver, that it expects an acknowledgement and also includes a time interval length during which it expects to receive an ACK form the other party.
4. At some point prior to the completion of process, for which Success indication is being sent, either party or both indicate a desire and/or capability to perform the reliability mechanisms. For instance in case of use of EAP signaling, this indication and/or negotiation can be included in any of the prior EAP Request and response messages prior to the EAP Success message.
5. When the result indication message includes a freshness value (for replay protection) or an identifier, the ACK needs to also include an anti-replay measure, e.g. including the same freshness value, a derivative thereof, etc.

Any of the above reliability mechanisms can have any of the following embodiments when it comes to receivers and senders:

1. The original indication (Success or Failure), its acknowledgement or any of their transmissions can be sent end to end (e.g. between a peer and a central server).
2. Delegation of reliability mechanism to intermediaries: The original indication (Success or Failure), its acknowledgement are intercepted by intermediaries, and the following retransmissions are handled by the intermediaries. For instance, the Success indication that is sent can be cached by an intermediary (such as the gateway). From that point on the intermediary performs the reliability mechanisms mentioned earlier. For instance the intermediary can cache and then retransmit result indications until it receives an ack from the other side. This will allow for lower layer protocols to deal with the reliability needs of result indication. Retransmission of the result indication can be done simply by resending the initial message/frame, or parsing a part of message that relates to the intermediary. That includes adding a new signature protection by the intermediary. Depending on the network policy and server requirements, reception of an ACK by an intermediary may be enough, without the need to send the ACK all the way back to the other end. This may effect the security requirements for protection of the ACK as well, since the key used to protect the ACK may be one shared with the intermediary or with the other end. When an ACK is intercepted by an intermediary, and the intermediary is not expected to relay it forward, the intermediary can simply decide to use the ACK as a trigger to perform further actions. When the intermediary is expected to relay it forward, the intermediary may decide to convert the ACK based on the semantics of the protocol it uses to interact with the other end (such as the central server) or the next hop and protect the ACK with keys that it shares with that entity (the keys may be different from previous hop on which the ACK was received). The capability/preference of interfacing with an intermediary for reliability and/or security mechanisms can be negotiated as part of the protocol as well.
3. When a result indication has additional payload, where some of the payloads are not destined for the receiving party but for the intermediaries, it is possible to drop such payloads from the retransmitted result indication. An example of this is where an EAP Success or another EAP result indication message carries service materials (such as keys) for a $3^{rd}$ party (such as another server or an authenticator). When that $3^{rd}$ party is on the path of the result indication to the end client, and has been delegated the reliability mechanism of the result indication, the party can exclude the payload for retransmissions. The $3^{rd}$ party may instead include its own assertion that it has removed a payload from the initial result indication message before retransmitting. The assertion can be based on a signature with a key shared between the $3^{rd}$ party and the end client. The assertion may include some indication on what sort of payload was omitted (this can be done using the payload identifier for the payload).

4. It is possible that a party that have received a result indication correctly and have ACKed it, receives another result indication. This is possible in case the party expecting an ACK has not received the ACK due to loss or other reasons, and thus has retransmitted the result indication. Depending on the policy or negotiation, the ACK can be sent again, even a previous ACK was sent before.

There may be indication (such as flags) on whether reliability and security protection of the result indication message is done end to end or through intermediaries.

For instance, an example of the second embodiment is when a client is being authenticated by an central server for access, through link layer mechanisms, an edge device (e.g. a base station or a gateway) can assure that the client has received the result indication emitted from a central server by caching and retransmitting the result indication from the server as many times as needed over the link layer, or the link between gateway and the client, without requiring any retransmission capabilities from initial protocol over which the result indication was send. Depending on the policy or the negotiation, the gateway, may after receiving the ACK, simply forward the ACK to the server or take the authority to start a new action such as a configuration/set up or access or key management procedure. For instance when EAP authentication is used, EAP does not support result indication protection or reliability. In such a case, there may also be link layer specific messages indicating to the end client that the base station or the gateway (EAP authenticator) is looking for an acknowledgement to the result indication. For instance, the link layer message carrying the Success message can include a Success_ACK_request flag.

A prime example would be a WiMAX or WLAN base station, controlled by an authenticator (ASN_GW) that itself acts as pass-through for an EAP server authenticating a mobile node, or for HOKEY server performing re-authentication and handover service. The Success indication (EAP Success, EAP finish, or a modified EAP Success) from back-end server can be sent to the authenticator, which forwards it to the base station. The BS caches the success indication and performs the reliability mechanism described earlier, i.e. retransmits the EAP Success, until it receives an ACK and then either locally starts the setting up the link with the mobile node, or forwards it to the ASN-GW and HOKEY server for further actions.

As mentioned earlier, in order to protect the end clients and network entities, it is desired to also protect Failure indications, so that no intermediary can change a failure indication to a Success indication, as this can lead to man in the middle attacks such as theft of service or denial of service (where a process that is in progress can fail due to "canned" and ungrounded Failures. All claims and procedures stated for Success should also apply to Failure indications, so when writing the claim, we can change Success Indication to Result indication.

The signature key (SIK) used to protect the result indication can generated based on the material exchanged during the authentication process. For instance in case of EAP authentications, the key can be generated from EMSK, MSK directly and be the same as a generic EAP integrity protection key or a key specifically generated to protect EAP success. The first case is as follows:

SIK=PRF (root key, "key for protection of result indication"|other info)

PRF is a pseudo random function that is used for key generation and is chosen based on network and client security requirements and policies. Root key can, as mentioned, be EMSK, or a usage specific key, such as a handover and re-authentication root key (HRK). Other info can include key length, end client identifier, etc.

When intermediaries are involved in protection of the result indication, then the signature key (SIK) must be made available to those intermediaries. For instance, when an authenticator is to protect the result indication, the SIK is generate from a key available to the authenticator master key.

The signature Key for protecting the ACK (SA_IK) can be the same or different from SIK. It is however, preferred that the two keys are the same.

The following embodiments for data result indication protection can enable capability discovery/negotiation between legacy and newer authentication, access control and key management services. For instance, when the legacy framework for authentication and key management is EAP based and, the entities involved, including but not limited to EAP server, service agent (authenticator) and end client/supplicant/EAP peer are using EAP key management functions and EAP master session key (MSK) for establishing secure links between the supplicant and the network. On the other hand when the involved entities use HOKEY framework, the key management functions use newer key hierarchies and EAP extended master session key (EMSK). Reliable and secure result indication will allow these entities to interact in a robust manner. This is done through any or all the following actions:

1. The result indication includes a flag showing the preference of the first party (the one sending result indication) on use of legacy versus new mechanism. In case of authentication and key management service, where the authentication server is performing EAP and the result indication is an EAP Success from the server, showing the completion of EAP authentication, the server can include its preference for EAP or HOKEY style key management and authentication service.
2. The ACK includes either an indication, confirming acceptance of the preference of the first party or a flag showing a different preference. In case, the authentication is EAP and the party sending ACK is a peer, the peer can either confirm the preference shown in the EAP Success message or show a different preference.
3. The result indication can be a different message depending on the preference for legacy versus newer method. For instance, if legacy EAP key management and authentication services are desired, the result indication can simply be an EAP Success message. If however, newer services are required, the result indication can be done through a modified result indication messages, such as a new EAP message or a modified version of EAP Success message.

4. Same as above bullet for the Acknowledgement message.
5. The preference flag can be included within an AAA attribute towards a service agent (authenticator) and can then be converted to a lower layer TLV to be presented to the supplicant.

An application of this is use of EAP signaling with a HOKEY-unaware authenticator. This is an application for 802.16e/802.16m interoperability:
1. The peer (mobile station) and the EAP server authenticate using EAP.
2. The EAP server sends an EAP Success to the authenticator, and includes its preference for use of HOKEY in an indication to the peer. This indication can be within EAP Success messages as mentioned or within an AAA attribute towards the authenticator.
3. The authenticator either forwards the preference within the EAP Success as is, or if included as AAA attribute, the authenticator creates a relevant TLV for the supplicant, indicating availability of HOKEY service. This disclosure includes use of TLV for communicating this preference over link layers, such as 802.16.
4. The peer indicates its preference on EAP or on support of HOKEY service to the server within its ACK.
5. The peer preference can trigger the HOKEY process, such as service authorization, and other signaling.

Embodiments of the present invention includes various features. Some of features of are as follows:
1. Building a reliability mechanism (ack, retransmission) for result indication for authentication, re-authentication and access control mechanisms, especially for EAP authentication and HOKEY re-authentication and key management without being authentication method dependent.
2. Building a security mechanism for the process at the same time.
3. Ability for intermediaries such as authenticator and base station to perform the required exchanges to avoid lengthy and expensive exchanges with the backend servers. At the same adding novel features to link layers.
4. Building the interoperability between newer and legacy methodology in case of EAP versus HOKEY procedures.

As shown, the above features may be in one or more of the embodiments described above. These features are merely examples, which should not unduly limit the scope of the claims herein. One of ordinary skill in the art would recognize many variations, modifications, and alternatives.

While a number of preferred embodiments of the disclosure have been shown and described herein, modifications thereof may be made by one skilled in the art without departing from the spirit and the teachings of the disclosure. The embodiments described herein are exemplary only and are not intended to be limiting. Many variations, combinations, and modifications of the disclosure disclosed herein are possible and are within the scope of the disclosure. Accordingly, the scope of protection is not limited by the description set out above, but is defined by the claims which follow, that scope including all equivalents of the subject matter of the claims.

What is claimed is:

1. A method of authentication in a communications system, comprising:
performing authentication of a user utilizing Extensible Authentication Protocol (EAP);
generating a result indication message by a server and transmitting the result indication message to the user by the server, the result indication message including an EAP success message and additional information for security and reliability, wherein the result indication message includes a protocol preference message providing backward compatibility between EAP and a different protocol; and
receiving an acknowledgement message from the user, the acknowledgement message confirming the reception of the result indication.

2. The method of claim 1 further comprising retransmitting the result indication message if the acknowledgement message is not received within a predetermined time.

3. The method of claim 1 wherein the additional information for security and reliability includes Message Authentication Code and time interval information.

4. The method of claim 1 wherein the additional information for security and reliability includes a security/reliability flag and a message authentication code (MAC).

5. The method of claim 1 wherein the method is performed by an Extensible Authentication Protocol (EAP) server.

6. The method of claim 1 wherein the method is performed by an authentication, authorization, and accounting (AAA) server.

7. The method of claim 1 wherein the method is performed by a network intermediary, the network intermediary including a base station, an access point, a gateway, or an EAP authenticator.

8. The method of claim 1 wherein the result indication message is adapted for further including a preference message for an EAP Extension protocol.

9. The method of claim 1 wherein the result indication message is adapted for further including additional payload, the additional payload including service material or keys for a third party.

10. The method of claim 1 wherein the sending of the result indication message includes sending the result indication message to an authenticator, and the result indication message is configured for further including a preference message for an EAP Extension protocol.

11. The method of claim 10 wherein the EAP Extension protocol is Hokey.

12. The method of claim 10 wherein the authenticator, after receiving the preference message, sends a TLV to the user indicating availability of HOKEY service, and thereafter the user sends a message indicating its preference for EAP or HOKEY.

13. A network device for use in a communications system, comprising:
a server configured to perform authentication of a user utilizing Extensible Authentication Protocol (EAP);
the server configured to generate a result indication message and transmit the result indication message to the user or an authenticator, wherein the result indication message includes an EAP success message and additional information for security and reliability, and wherein the result indication message includes a protocol reference message providing backward compatibility between EAP and a different protocol;
the server configured to receive an acknowledgement message from the user, the acknowledgement message is configured to include a Message Authentication Code; and
the server configured to confirm authentication of the user.

14. The device of claim 13 wherein a second component is configured to retransmit the result indication if the acknowledgement message is not received.

15. The device of claim 13 wherein the additional information for security and reliability includes a first Message Authentication Code and time interval information.

16. The device of claim 13 wherein the additional information for security and reliability includes a security/reliability flag and a message authentication code (MAC).

17. The device of claim 13 wherein the network device includes an EAP server or an AAA server.

18. The device of claim 13 wherein the network device comprises a network intermediary, the network intermediary including an EAP authenticator.

19. The device of claim 13 wherein the result indication message is configured for further including a preference message for an EAP Extension protocol.

20. The device of claim 19 wherein the EAP Extension protocol is Hokey.

21. The device of claim 13 wherein the result indication message is configured for further including additional payload, the additional payload including service material or keys for a third party.

22. The device of claim 13 wherein a second component is configured for sending the result indication message to an authenticator, and the result indication message being capable of further including a preference message for an EAP Extension protocol.

23. The device of claim 22 wherein the EAP Extension protocol is Hokey.

24. The device of claim 23 wherein the authenticator, after receiving the preference message, is configured to send a TLV to the user indicating availability of HOKEY service, and thereafter the user sends a message indicating its preference for EAP or HOKEY.

25. A communications system comprising:
a network peer device; and
a network server device, adapted to:
perform authentication of the network peer device utilizing Extensible . Authentication Protocol (EAP);
generate a result indication message by a server and transmit the result indication message to the network peer device by the server, wherein the result indication message includes an EAP success message and additional information for security and reliability, and wherein the result indication message includes a protocol preference message providing backward compatibility between EAP and a different protocol;
receive an acknowledgement message from the network peer device, wherein the acknowledgement message is configured to include a Message Authentication Code; and
confirm authentication of the network peer device.

26. The system of claim 25 further comprising an intermediary authenticator device that is adapted to:
transmit a result indication message to the network peer device, the result indication message including a success message that is capable of including additional information for security and reliability;
receive an acknowledgement message from the network peer device, the acknowledgement message is configured to include a second signature; and
transmit the acknowledge message to the server device.

27. The system of claim 26 wherein the network server device is adapted for retransmitting the result indication if the acknowledgement message is not received.

28. The system of claim 26 wherein the success message is capable of further including a preference message for a protocol other than EAP, the protocol including Handover Keying (HOKEY).

29. The system of claim 26 wherein the network server device is further adapted to send the success message to an authenticator, and the success message being capable of further including a preference message for a protocol other than EAP, the protocol including Handover Keying (HOKEY).

30. The system of claim 29 wherein the authenticator, after receiving the preference message, sends a TLV to the user indicating availability of HOKEY service, and the user is adapted to send a message indicating its preference for EAP or HOKEY.

* * * * *